United States Patent
Crespo Araoz et al.

(10) Patent No.: US 12,146,108 B2
(45) Date of Patent: Nov. 19, 2024

(54) METHOD FOR PRODUCING LIQUID FUEL FROM PLASTIC OR POLYMER WASTE

(71) Applicant: ECOFUELS SPA, Santiago (CL)

(72) Inventors: Ariel Daniel Crespo Araoz, Santiago (CL); José Alfredo Duguet Saéz, Santiago (CL)

(73) Assignee: Ecofuels Spa, Santiago (CL)

( * ) Notice: Subject to any disclaimer, the term of this patent is extended or adjusted under 35 U.S.C. 154(b) by 0 days.

(21) Appl. No.: 18/016,668

(22) PCT Filed: Jul. 15, 2020

(86) PCT No.: PCT/CL2020/050074
§ 371 (c)(1),
(2) Date: Jan. 17, 2023

(87) PCT Pub. No.: WO2022/011484
PCT Pub. Date: Jan. 20, 2022

(65) Prior Publication Data
US 2024/0034939 A1    Feb. 1, 2024

(51) Int. Cl.
*C10G 15/08* (2006.01)
*B01J 6/00* (2006.01)
(Continued)

(52) U.S. Cl.
CPC .............. *C10G 15/08* (2013.01); *B01J 6/008* (2013.01); *B09B 3/40* (2022.01); *C10B 53/07* (2013.01);
(Continued)

(58) Field of Classification Search
CPC .................... C10G 15/08; C10G 11/05; C10G 2300/1003; C10G 2300/4006;
(Continued)

(56) References Cited

U.S. PATENT DOCUMENTS 8,187,428 B2    5/2012   Shimo et al.
2008/0202983 A1  8/2008   Smith
(Continued)

FOREIGN PATENT DOCUMENTS

CA    2558401 A1    5/2007
CL    201802755 A1  1/2019
(Continued)

OTHER PUBLICATIONS

Arce Lucin, J. C. & Suarez Moreno, S.K.; Obtencion y caracterizacion de combustible a partir de desechos termoplasticos PEBD (Low Density Polyethylene) recolectados en la Universidad de Guayaquil; http://repositorio.ug.edu.ec/bitstream/redug/18340/1/401-1230%20-%20Obtenci%C3%B3n%20y%20caracterizaci%C3%B3n%20de%20combustible%20a20partir%20de%20desechos%20termopl%C3%A1sticos.pdf; 2017.

(Continued)

*Primary Examiner* — Ali Z Fadhel
(74) *Attorney, Agent, or Firm* — Winthrop & Weinstine, P.A.

(57) ABSTRACT

The invention relates to a method and system for obtaining a liquid fuel from waste from plastic or polymer material, which, according to its structure of steps and devices, allows lower energy use with respect to the disclosure in the prior art. In addition, by means of the method and system, the load of plastic and polymer waste in the environment, mainly waste that may be destined for landfill, is reduced. Thus, in (Continued)

addition to waste material being reduced, energy is recovered at highly favourable cost, as a result of the layout of electric heating elements for delivering the energy or heat needed to correctly transform the waste material, in short processing periods and with the adaptability of being able to be formed from moveable, transportable systems, even large industrial installations.

24 Claims, 2 Drawing Sheets

(51) Int. Cl.
    *B09B 3/40*     (2022.01)
    *C10B 53/07*     (2006.01)
    *C10G 11/05*     (2006.01)

(52) U.S. Cl.
    CPC ...... *C10G 11/05* (2013.01); *C10G 2300/1003* (2013.01); *C10G 2300/4006* (2013.01); *C10G 2300/4012* (2013.01)

(58) Field of Classification Search
    CPC ............ C10G 2300/4012; C10G 47/18; C10G 57/06; C10G 1/10; B01J 6/008; B09B 3/40; B09B 3/00; C10B 53/07; C10K 1/04; C10L 1/04; Y02P 20/10; Y02P 20/143; Y02W 30/20; Y02W 30/62; C08J 11/12

See application file for complete search history.

(56) References Cited

U.S. PATENT DOCUMENTS

| | | |
|---|---|---|
| 2014/0246301 A1 | 9/2014 | Ito et al. |
| 2015/0376508 A1 | 12/2015 | Griffiths |
| 2017/0283706 A1 | 10/2017 | Schabel et al. |
| 2018/0134963 A1 | 5/2018 | Lepez et al. |
| 2019/0275486 A1 | 9/2019 | Peltekis et al. |

FOREIGN PATENT DOCUMENTS

| | | |
|---|---|---|
| GB | 683146 A | 11/1952 |
| GB | 695473 A | 8/1953 |

OTHER PUBLICATIONS

International Search Report for corresponding International Application No. PCT/CL2020/050074 (with English Translation) mailed on Jan. 25, 2021; 7 pages.

Written Opinion for corresponding International Application No. PCT/CL2020/050074 mailed on Jan. 25, 2021; 8 pages.

METHOD FOR PRODUCING LIQUID FUEL FROM PLASTIC OR POLYMER WASTE

CROSS-REFERENCE TO RELATED APPLICATIONS

This application is a National Stage Application of PCT/CL2020/050074, filed on 15 Jul. 2020, and which application is incorporated herein by reference. A claim of priority, to the extent appropriate, is made.

FIELD OF THE INVENTION

The present invention is related to the technical field of treating plastic or polymeric waste and the generation of fuels from said waste. More specifically, it's a process for obtaining a quid fuel from plastic or polymeric material waste and an appropriate system to carry out said process. Thus, in a particular way, the present invention aims to have a method to generate fuel from residual materials, which according to its design, assembly and configuration, allows reduced energy consumption compared to what is known in the state-of-the-art.

BACKGROUND OF THE INVENTION

The remarkable industrial and population development that has occurred in recent years in the world has led to the people of the world's largest cities increasing considerably. Although the above can be considered an average factor within economic, scientific, and social development for the whole world, it is also known that such action has been accompanied by components that, in one way or another, have meant a deterioration of the natural environment. Moreover, population growth brings with it different elements that are making urban and industrial development more complicated, such as the large generation of solid waste, both domestic and industrial, which, in some way, must be managed. In every social sphere, it is very well known that population development or demographic growth has caused a noticeable increase in the generation of solid waste, which has translated into a challenge for governments, academics, and companies, to find the best way to manage them.

In an increasingly globalized world, it is known that all large urban centers face the same environmental, energy, and social problems. In an open and accessible market economy, it is a logical condition that industrial development is a fundamental element to achieving the satisfaction of population needs. Chile is not the exception, and the industrial and social development experienced in the last 40 years, has also meant the growth of environmental deterioration and the evolution of energy needs. Regarding environmental decline, according to official studies in 2017, 7,487,559 tons of solid urban waste were generated in Chile, which means an increase of 9.98% between 2012 and 2017. After that, another study in 2017 revealed that the production of solid urban waste in Chile was 1.22 (kg/inhab/day). According to a survey by the Advanced Polymers Research Center, on average in Chile, no lesser part of solid urban waste corresponds to some plastic, which on average, reaches 15%, and in the most developed cities, reaches an average of 17%. According to this, in 2017, more than one million tons of plastic material were part of urban solid waste in Chile. According to a study by the Asociación Gremial de Industriales del Plástico (ASIPLA) published in 2019 that assesses the recycling capacity of plastics in Chile, only 8.5% of the total apparent consumption of plastic is recycled, indicating that 83,679 tons were recycled in the year of the study. Therefore, a large percentage of plastics remain unrecycled and can be a harmful element to the environment. It is very well known that today, plastics are a large part of the products that humanity uses or consumes food packaging, kitchen utensils, footwear or clothing, electrical appliances, construction tools, vehicle accessories, etc. No plastic material is discarded since there is a fraction used in construction (18%) and mining (19%) that have a long period of use, but the proportion of containers and packaging (48%) does not. In this context, the plastics processing and recycling chain is divided by the seven types of plastics that are: i) polyethylene terephthalate, ii) high-density polyethylene, iii) polyvinyl chloride, iv) low-density polyethylene, v) polypropylene, vi) polystyrene, vii) others (bioplastics, polycarbonate or mixtures of the other plastics), of which only I and iv are reprocessed.

The environmental deterioration caused by plastic waste not only affects Chile but is also latent around the world. Indeed, according to a PlasticEurope study, in 2018, the production of plastics in the world reached 360 million tons, of which around 65 million were produced in North America and about 62 million were made in Europe. Precisely, in Europe, in the same year, 2018, about 29 million tons of plastic waste were generated, and only 32.5% were recycled; 42.8% were used for energy recovery, and 24.9% were destined for landfills and oceans. More than 7 million tons were disposed of in landfills without any possible alternative treatment, contributing to severe environmental pollution. On the other hand, world energy consumption is also closely related to industrial development and population growth. Undoubtedly, the world has seen an accelerated evolution of world energy demand during the last century. For this reason, great concern and doubts are formulated about the possibility of continuing to rely on fossil fuels as the primary energy source. Likewise, there is a need to have new energy sources or to optimize the use of available energy sources. This genuine concern can be seen in the numerous studies that have recently been carried out and continue to be carried out on projections of future energy demand, estimates of fossil fuel resource reserves, and the search for alternative energy sources.

Energy sources available today, like coal, natural gas, oil, nuclear energy, and hydraulic energy, are often considered primary energies. The direct energy must be previously transformed (for example, although it is being reduced, the coal in a thermoelectric plant) and later transported and distributed to be able to be used as secondary or final energy (following the previous example, electricity) in demand devices (electric motors, electric heaters, etc.) that allow obtaining sound energy (mechanical energy, heating, etc.). The associated losses occur at all stages of this transformation process from primary to secondary energy and to use energy. Also, it is well known that the progressive increase in oil prices, the main component of the energy supply, is the first symptom of the "energy crisis." But, the severity of the energy crisis will be caused by the greater or lesser speed of the depletion of the oil fields, by the technical and economic possibilities of substituting this fossil fuel for other primary energy sources that are, or more abundant, or from a renewable source.

Oil depletion in the medium term must be compensated by its substitution for other alternative liquid fuels and by promoting the development of new and renewable energy sources. The contribution of unique energies to the world energy balance is still much lower than that of traditional sources. However, the efforts being made in the research and development of new technologies allow reasonable expectations that, in the medium term, the contribution of these energy sources will be significant.

Thus, given the broad and challenging environmental and energetic landscape mentioned above, the generation of plastic waste, and the anticipated energy crisis, some scientists have tried to develop processes to address both problems simultaneously. An outstanding example is the Japanese inventor Akinori Ito, who popularized the concept of converting plastic waste into liquid fuel through plastic pyrolysis. Pyrolysis is a thermochemical decomposition of organic material, such as plastics, at elevated temperatures without oxygen. In the process developed by Akinori Ito, pyrolysis typically occurs at temperatures 400 to 900° C., with pressures of 1.5 atm. The procedure published by Akinori Ito is carried out in the following way; the plastic is introduced into a tank, which is heated until the plastic melts, and the resulting gas goes through a cold-water tank through a tube that converts the gas into oil and, later, through refining, transforms it into any derivative thereof that can be used as a liquid fuel. From this process, Akinori Ito created the Japanese company Blest, responsible for producing and marketing equipment to carry out the pyrolysis process developed by Akinori Ito. According to Blest's advertising, with the method developed in his machine, one kilogram of plastic can produce 1 liter of gasoline with only one kilowatt of energy, which has been widely shown that this is not the case and cannot be possible.

To try to carry out his process, he registered the patent of invention U.S. Pat. No. 8,187,428, using which he protects an apparatus for converting plastic to fuel, which comprises: a fusing unit to heat and melt the plastic fed to it; and a decomposition unit for further heating and vaporization decomposition of the molten plastic by the melting process, wherein the decomposition unit is inclined upward, has a conveyor screw mounted therein and is provided at its end portion top with a catalyst cylinder extending upward and a waste extraction unit extending downward, and wherein the decomposition unit is designed to prevent molten plastic gas from flowing into the unit waste extraction, separate electric heaters (not specified) deliver the heat to the melting unit and the decomposition unit. Subsequently, Akinori Ito presented the invention patent application US 20140246301, using which he tries to protect an improvement to his initial apparatus, by which he describes a plastic-to-fuel conversion apparatus, which is provided with rotating members in a heating unit and in a decomposition unit, a waste tank, and a catalyst, wherein a plastic gel is fed to a first buffer tank (2) that includes a vertically arranged cylinder, a second buffer tank (3) that consists of a vertically arranged cylinder and finally a vaporization container (4) including a laterally arranged cylinder (4A), a liquid surface (LS) in the vaporization container (4) that is set in a central diagonal position in the vertical direction of the cylinder controlling both the plastic gel feed amount and the liquid surface temperature to be a temperature of 400° C. to 410° C., so that rotating members, waste tank, and catalyst are not required. External plates provide heat to the buffer tanks that are located on the outer circumferential surfaces.

Although the process and equipment developed by Akinori Ito have meant a significant advance in the management of plastic waste, the great problem that it has had to face is the high energy consumption that it needs for the operation of its equipment, the heating plates arranged on the external surfaces of the ducts are not efficient enough for their "Blest" equipment to scaled-up its production.

On the other hand, in state of the art, various processes and systems have been disclosed to be able to generate fuel from plastic waste; thus, for example, there is document US 20150376508 by Adrian Griffiths, which tells a process for the treatment of mixed plastic waste, which comprises: feeding the trash to a pyrolysis reactor; effect degradation of the garbage in the pyrolysis reactor to produce a fuel; and using the power to run a generator to produce electricity. In this case, a filter is arranged at the outlet of the pyrolysis reactor, which will filter the exit gases; a fraction of these gases are used in a burner of heat transfer equipment to provide heat to the pyrolysis reactor, and the rest of the gases are passed through a condenser. Finally, the fuel reaches a tank arranged for storage, from where the engine of a power generator is fed. The document mentions that a part of the energy necessary to heat the pyrolysis reactor is extracted from a fraction of the gas generated. If it is not enough, energy is used from a generator fed with the generated fuel. Due to the large amount of equipment used for this process, the energy requirements are higher. Griffiths uses a fluidized bed reactor for pyrolysis, filtration equipment, a heat exchanger, and pumps; these units require high energy consumption.

Another disclosure of state of the art is the document CA 2558401 by Christian Koch, which develops a complex process and device to produce diesel oil from residual substances containing hydrocarbons in an oil circuit with separation of solids and distillation. of product to obtain the diesel product, through the supply of energy, for the central heating, several high-performance chamber mixers and with the use of crystallized potassium, sodium, calcium, and magnesium catalysts. The complex system requires high energy consumption, which includes reactors, extrusion screws, filters, pumps, a distillation tower, and other minor equipment. All the initial heating is carried out using an external heating of smoke gases and an electric heating system located outside the extrusion and separation screw. The initial heating is carried out using energy provided by a generator that uses gas generated in the process. This complex system could be more efficient from the energy point of view; it also requires a long development time to obtain the final product. For its part, the document US 20190275486 by Kon Peltekis discloses a process and a plant comprising: a pyrolysis reactor configured to heat molten mixed plastic waste to produce: pyrolysis gases at a first temperature of approximately 350° C. up to 425° C.; and pyrolysis sludge or pyrolytic carbon at a second temperature of 722° C. to 1400° C. This pyrolysis plant and the process can convert mixed plastic waste feedstock into pyrolysis products comprising pyrolysis gases, pyrolysis condensates, non-condensable pyrolysis gases, pyrolysis slurry, and pyrolytic carbon. Pyrolysis condensates can be fractionated into synthetic natural gas, crude oil, and diesel fuel products. The pyrolysis heat vessel can be heated by induction heating, gas burner heating, or a combination of both. The plant also includes a heated extruder configured to extrude and heat the mixed plastic waste feedstock to an initial temperature of about 280° C. and up to 320° C. to form a molten plastic waste that is fed into the pyrolysis reactor vessel at a temperature between 722° C. to approximately 1400° C. The non-condensable pyrolysis gases are collected and used in the heating equipment; thus also, the heated thermal oil can be used in place of the required electrical energy. As can be seen, the process requires different energy sources to heat various equipment that makes up the plant.

Finally, the Chilean invention patent application CL 201802755, by the inventors Schabel, Schwarz, Grispin, and others, discloses a process and apparatus for producing petroleum products from raw material comprising polymeric materials. Said process requires the application of energy for the transformation of the polymeric material, which is achieved using a temperature gradient that is applied to the reactor using the transport of gas in one or more channels along the reactor vessel. The process is carried out in a reactor comprising a plurality of sequential zones along the horizontal axis of the apparatus, where the molten material advances through most zones of the reactor employing an endless screw. The process disclosed in the application CL 201802755 requires two different energy sources to carry out the operation; firstly, the heat energy delivered by the gas that flows through the external channels of the reactor and that allows the pyrolysis of the material. Polymeric inside the reactor and, secondly, the electrical energy for the operation of, at least, the endless screw that is located inside the reactor. Furthermore, the complexity of the apparatus, with the operation of the infinite screw inside the reactor at high temperatures, does not guarantee easy handling of the process and the device.

As can be seen, the different equipment and processes available in state of the art have combinations of energy sources. They require high energy consumption, given the high number of components in each system. None of the state-of-the-art documents has been able to quantify and make public the energy requirements precisely because if they make them public, every reader will realize that the disclosed processes and systems are not energy efficient. And although the energy balance that the produced fuel can generate may be optimistic about the total energy consumption, even when the same gas or fuel produced is used, the difference between the energy used and the energy produced is meager, which makes all of them not economically feasible. Likewise, the processing time involved in transforming the plastic waste into liquid fuel in all the equipment of states of the art, including the Blest equipment, is more significant than 100 minutes counted from the moment the reactor is loaded until the fuel is obtained. Liquid. Finally, all the systems disclosed in the state of the art, except the Blest equipment, correspond to fixed designs, incapable of being formed as a mobile system that can be easily transportable.

As can be seen, there is no process and system in state of the art for obtaining liquid fuel from waste plastic or polymeric material, with reduced energy consumption, whose processing time is reduced and that, in addition, can be scalable from a mobile and transportable system to be configured as a fixed plant capable of processing daily tons of plastic waste.

SUMMARY OF THE INVENTION

The process and system for obtaining liquid fuel from waste plastic or polymeric material described in the present invention are within the group of essential elements for the conservation and sustainable maintenance of the environment. Where through said process and system, it is possible to reduce the load of plastic and polymeric waste in the background, mainly those wastes that may have a landfill as their destination. Apart from the reduction of residual material, any recovery is achieved at absolutely favorable costs, thanks to its configuration of electrical resistances to deliver the energy or heat necessary for the correct transformation of the residual material, short periods of processing, and the ductility of being able to conform from mobile and transportable systems to extensive industrial facilities. However, all the above characteristics are not achieved by any process, and methods are known as state-of-the-art.

In particular, in the present invention patent application, the design of the thermochemical reactor and the system are protected to obtain liquid fuel from waste plastic material or polymeric material, with reduced energy consumption and in short processing times, where the plastic material waste that has been first collected and crushed, are subjected to the following stages:

disposing of the crushed plastic material in a processing reactor, in order from most minor to largest particle size;

vertically arranging the processing reactor in an isolated furnace with a ceramic system of at least 3 centimeters thick and covered with a material based on fiberglass with a thickness between 4 and 10 centimeters;

preheat the insulated oven to a temperature of 200° C. for at least 10 minutes;

start a temperature increase ramp to keep the reaction constant in a temperature range between 345 and 515° C. through the application of intermittent pulses of energy consumption for heating;

keep the reactor pressure between 0.4 and 1 MPa, controlled by a pressure gauge and using a drain valve;

start thermal cracking of the plastic material inside the reactor, keeping the temperature constant for a time of between 30 and 50 minutes;

release of the gaseous fraction through an upper duct of the reactor;

release of the liquid fraction through the upper duct of the reactor;

transfer of the liquid fraction towards a cooling coil to decant into a container containing a highly polar cooling fluid with a higher density than the recovered liquid fuel;

extraction of the liquid fuel recovered from the container;

storage of recovered liquid fuel in receiving containers; and recovery of the solid fraction decanted in the reactor.

BRIEF DESCRIPTION OF THE DRAWINGS

A detailed description of the invention will be carried out in conjunction with the figures forming this application.

It is essential to indicate that the figures only act as support elements for a better understanding of the invention, without them representing the components on a natural and/or proportional scale; thus also, the figures represent the views of the system relative to the essential parts of the invention, without including details of the system or its complementary facilities in their natural state, such as transport elements, connection elements, security elements, electronic circuits, connectors, etc. The invention can only be limited to what appears in the figures since they represent generic elements relevant to the system, and features generally known as state-of-the-art may not be included. So then, the following figures are described.

All the numerical references made throughout the description must be considered in the whole set of the figures since it is the case that in the same paragraph, numerical references are made to elements that can be found in two or more different statistics.

DETAILED DESCRIPTION OF THE INVENTION

For a better understanding of the present invention, it is necessary to provide the following definitions, which should only be meant as elements that help to understand the singular and technical characteristics in this specialized field:

System: a group of components, devices, devices or organized and complex objects, dynamically related, that together make up a unitary whole and give way to an activity that has a purpose, where said system and components act on physical, chemic, al or biological elements to achieve the goal and deliver a result.

Process: an ordered succession of stages, steps, instructions, or cause-effect reactions, which allow one to go from an initial to a final example according to a purpose.

Thermocracking: breaking of the polymeric chains in a random way where gaseous, liquid, and solid fractions are generated.

Gas fraction: a set of compounds, mainly derived from carbon, which is in a gaseous state at room temperature.

Liquid fraction: a set of compounds derived from carbon in a liquid state at room temperature.

Ramp: rapid temperature increase within a defined period until the expected operating temperature is reached.

Pulse: the force of an element that is applied in a specific way to a thing to exert a unique physical action at that moment.

Processing reactor: container designed so that the physical and chemical reactions of the process take place inside.

PID Controller: Controller (Proportional, Integral, and Derivative) is a simultaneous feedback control mechanism widely used in industrial systems.

Plastic is a material that, thanks to its unique combination of properties such as low cost, high versatility, high durability, and an excellent resistance-to-weight ratio, has allowed significant advances in the development of humanity in the last century. It is practically impossible not to have contact with some plastic objects daily. It is present in homes, means of transport, offices, schools, and even our daily footwear and clothing. In 2020, in Chile, the Chilean Plastics Pact presented a roadmap that seeks to become a national strategy for using plastic containers and packaging to move towards a circular economy where plastic does not impact the environment. This document recognizes that plastic is a material that has allowed significant advances in the development of humanity in the last century and provides evidence that in the previous 50 years, the production of plastics has increased 20 times, reaching 359 million tons in the year 2018 and that, if the current trend continues, it is estimated that in 2050 it will even increase the volume of its production by four times. Currently, 32% of containers and packaging leak from collection systems and contaminate different ecosystems. A definitive solution would be to implement a circular economy model globally, which would generate economic incentives to take advantage of post-consumer plastics. According to the roadmap of the Chilean Plastics Pact, the excellent opportunity for the industry when moving from the linear economy to the circular economy is that instead of becoming waste, the plastic retains its value and remains in circulation, constantly re-entering the economy as an input. In this context, it is pointed out that there is an excellent opportunity for the industry when moving from the linear economy to the circulating economy, which is that plastic, instead of becoming waste, conserves its value and remains in circulation, re-entering the economy as a technical or biological input, thus generating opportunities from post-consumer plastic. Some of the immediate positive effects this circular economy would have would be the reduction of plastic waste to the environment and the decrease in the consumption of fossil fuels as raw materials, among others. As stated in the roadmap of the Chilean Plastics Pact, the vision of creating an economy where plastic does not impact the environment is established. This systemic change requires radical coordination and collaboration between all the stakeholders that influence the life cycle of this material to ensure that the material at no stage loses its value and, therefore, remains circulating for longer without ending in landfills or the environment. Thus, then, within this concept of circular economy, which seeks to integrate respect for the environment and the need for economic growth to achieve an improvement in people's quality of life, favoring reuse over recycling, is that it optimally fits the process and the system for generating fuel from plastic or polymeric waste materials, developed by the inventors in the present invention patent application.

Undoubtedly, within the development of the plastic or polymeric materials industry, the correct use of waste materials from this industry becomes a fundamental component for the entire production cycle, as it offers a process and system that can be executed at cost. This is because of reduced operation, which implies that it can be economically profitable, either in its minimum size for portable systems or for its scaling up to large systems capable of operating with large amounts of plastic or polymeric waste; in this way, it increases the possibility that small localities can self-manage the management of their plastic waste, granting greater autonomy and capacity to treat plastic waste that has a level of degradation whose logistical cost does not allow its treatment at present, in addition to self-supply of liquid fuel.

As is already known, most plastic products come from hydrocarbons, representing about 6% of the world's total oil and gas production. These plastics are classified into two types: thermoplastics, which can be subjected to heat to be molded into new products without losing their inherent properties, and thermosets, which, when subjected to their processing temperatures, favor chemical reactions that alter the properties of the material Polyethylene's, polyethylene's account for most of the waste, followed by polypropylenes, polystyrenes, and polyvinyl chlorides. According to figures from the Association of Plastics Industries, the commercialization of thermoplastic resins in the national market is concentrated in polyethylene: high and low density (HDPE and LDPE), and terephthalate (PET), which represent approximately 56% of the consumption of tons of plastic. About 29% corresponds to polypropylene (PP), polyvinyl chloride (PVC), polystyrene (PS), and polyurethane. The rest of the raw materials are made up of other types of resin (6%), and finally, with very marginal participation, recycled materials appear at 1%. Most of the products created correspond to containers and packaging, which comprise 48% of the manufacturing of the national industry and are translated into bags, beverage bottles, non-perishable food packaging, and films, among others.

Many experts in the field project that by 2050 the production of plastics will use 14% of the greenhouse gas emission budget that remains available to keep climate change below 1.5 degrees Celsius. Furthermore, if we continue to produce, use, and dispose of plastic as we do today, by 2050, there will be more plastic than fish in the oceans. Therefore, within the importance of the plastic industry in daily life, it is necessary to have a system that can reuse plastic waste, but that is within the physical and economic scope for a large number of people, institutions, towns, and large cities, can have access to a type of technology that takes care of the environment and the economy. However, as already mentioned, current systems for the reuse of plastic significantly resent two significant types of problems: their high energy consumption, which makes them inefficient, and the orientation towards large plants, which makes it a complex system and out of reach of people and small communities. Therefore, it is necessary to have a process and a method for the treatment and reuse of plastic or polymeric waste and the generation of fuels which has high energy efficiency and are available to a large percentage of the population.

As previously indicated, it is necessary for the process and the system to treat and reuse plastic or polymeric waste to perform with high energy efficiency. Said energy efficiency implies that the energy consumption required to transform a certain amount of plastic waste is significantly lower than the energy produced from the number of plastics, the present invention, it is sought to have a process and a system for obtaining liquid fuel from plastic waste or polymeric material, which meets all the requirements that transform it into a technological development with clear advantages over what is known in state of the art.

By considering all the existing problems in state of the art and after different analyzes and developments of models and prototypes, the inventors of the present brief, through a series of tests and iterations applying the scientific method, have developed a new process and a novel system for obtaining liquid fuel from plastic material waste or polymeric material, which, given its design and configuration, allows to overcome the problems mentioned in state of the art. That is, through this process and system, the following advantages are achieved:

reduced energy consumption (lower operating costs);
less processing time;
the ability to be mobile or transportable;
modularity that makes it an easily scalable process; and
user-friendly operation.

Figure 1:
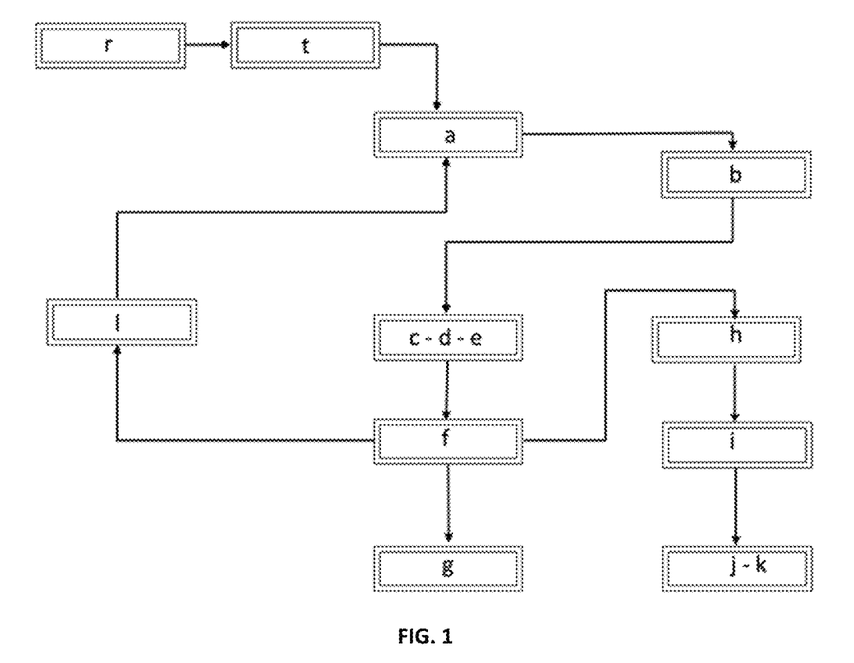
FIG. 1 represents a general diagram that includes the main stages involved in the process according to the present invention.

FIG. 1 shows a general diagram of the process through the main stages of innovating and obtaining fuel from waste plastic or polymeric material. The said process begins when the plastic or polymeric material waste is collected (r) and crushed (t) in preliminary stages; then the process continues with the following steps:

(a) disposing of the crushed/shredded plastic or polymeric material in a processing reactor (10) (in the future also referred to only as a reactor") in order from most minor to largest particle size;

(b) vertically arranging the reactor (10) in an isolated furnace (20) (from now on also referred to only as "furnace") with a ceramic system of at least 3 centimeters thick and covered with a fiberglass-based material with a thickness between 4 and 10 centimeters;

(c) preheating the oven (20) to a temperature of 200° C. for at least 10 minutes; this preheating is carried out with a moderate rise in temperature as time progresses;

(d) start a temperature increase ramp to keep the reaction constant in a temperature range between 345 to 515° C. through intermittent temperature pulses; said ramp means that a rapid temperature increase is carried out in a short period. Time, which, if compared in a temperature graph with the preheating of the previous stage, causes an essential change in the slope of the line is observed; these temperature impulses imply a sudden increase in temperature in a short time that exceeds the temperature reaction inside the reactor (10);

(e) maintain the pressure of the reactor (10) between 0.4 and 1 MPa, which is controlled with a pressure gauge (15) and is regulated using a drain valve (16);

(f) start the thermocracking of the plastic material inside the reactor (10), keeping the temperature constant for a time between 30 and 50 minutes; said thermocracking involves the cutting of the polymer chains randomly, generating gaseous and liquid fractions and solid;

(g) release of the gaseous fraction through an upper duct (14) of the reactor (10);

(h) release of the liquid fraction through the upper duct (14) of the reactor (10);

(i) transferring the liquid fraction to a cooling coil (30) to decant into a container (40) containing a highly polar cooling fluid with a higher density than the recovered liquid fuel;

(j) removing the recovered liquid fuel from the container (40);

(k) storage of recovered liquid fuel in receiving containers (60); Y (l) recovery of the solid fraction decanted in the reactor (10).

Figure 2:
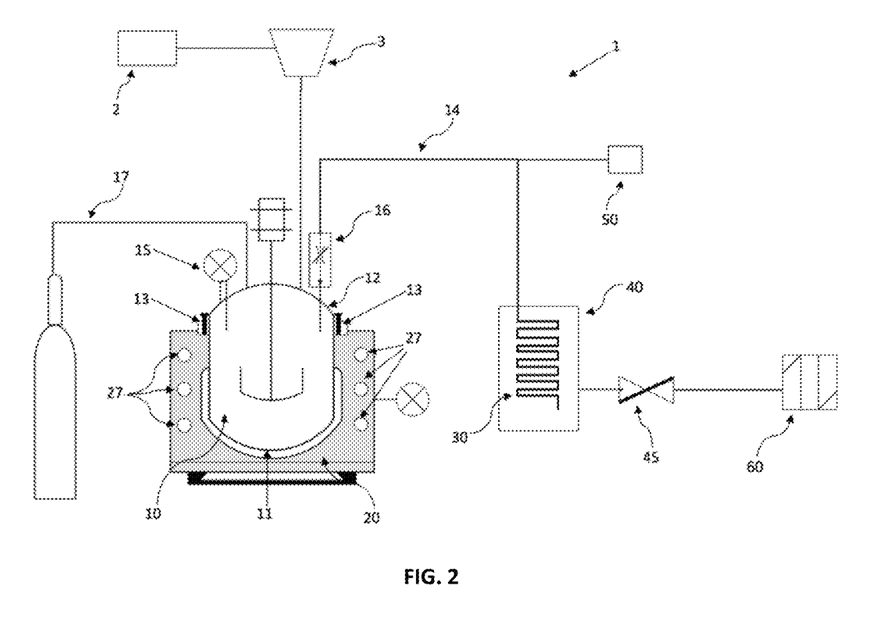
FIG. 2 represents a side view, not scaled, of the system according to the present invention, where the reactor-furnace assembly is shown as a longitudinal section view.
Figure 3:
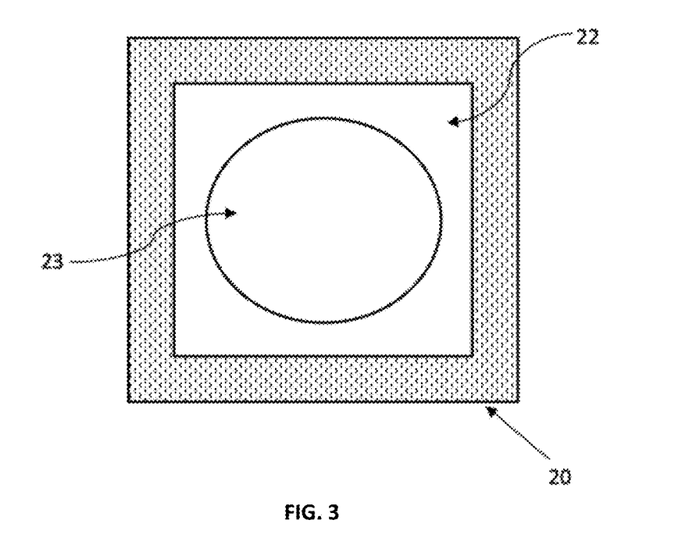
FIG. 3 represents a top view of the oven that is part of the system according to the present invention.

A relevant novel element of the process of the invention is given because the temperature increase in a furnace (20) is carried out using intermittent pulses of energy consumption to produce heat, which is carried out by silicon carbide resistors in a specific configuration that increases energy efficiency distribution (proper heat transfer and isolation), which are controlled, so that delivers a temperature in the range of 600 to 1500° C. in a period that varies between 1 to 360 seconds. Said intermittent temperature pulses, produced by the silicon carbide resistors, can maintain a constant temperature in the furnace (20) with high insulation capacity, between around 400° C. and 600° C. Said application of intermittent pulses makes it possible to give heat blows to the stove (20) and as to the corresponding heat transfer to the reactor (10) so that, by not keeping the silicon carbide heating elements constantly on, the energy consumption is less than if they were kept permanently on to keep the temperature constant in the reactor (10) since the intermittent pulses are generated by an unsteady energy flow from the silicon carbide resistors that generate consumption of 0 to 32 amps per pulse. This configuration allows reaching proper temperature ramps with less energy consumption than current conventional heating designs.

To achieve an improved thermocracking stage, it is vital to monitor the thermal balance in the reactor (10), employing a PID control system capable of controlling the internal and external temperatures of the furnace (20).

Once the process is already in operation, the released gaseous fraction is transferred directly to a burning device (50), where all the combusted hydrocarbon gases are reduced and released in the form of $CO_2$. Although, in an alternative form of realization of the process, the released gaseous fraction can be stored in tanks specially adapted for its storage or recirculated using an alternative injection system to be burned inside the furnace to generate a complementary energy source in the system (20).

On the other hand, the solid fraction generated in the reactor (10) is recovered and re-entered in the thermocracking stage. Said recovery can be carried out employing an evacuation valve arranged at the bottom of the reactor (not shown in the figures) and re-entered directly to the processing reactor using a connection duct (not shown in the figures). Or, it can be withdrawn from the same reactor (10) after each processing cycle and re-entered at the beginning of a new process.

Regarding the recovery of the most relevant fraction for the product obtained through the process, that is, the liquid fraction that is directed towards the cooling coil (30), the hydrocarbons are separated by their condensation point and by the difference of density between the fluids of the container (40), which allows the removal of particulate material and other sulfur, nitrogenous or carbon-derived components, through a phase separation, where these components will settle at the bottom of the container (40).

For correct and efficient execution of the process of the present invention, the crushed plastic material is adapted to have a particle size between 425 and 4750 μm; said crushed plastic material, before entering the reactor (10), is separated by a system of sieving to form three groups with ranges of particle diameters: (i), between 2350 and 4750 μm; (ii) between 1400 and 2350 μm; and (iii) between 425-1400 μm. Furthermore, in an alternative or complementary embodiment to the separation by the size of the sieved particulate material, it can be subjected to a sub-step of separation into groups for which temperature ranges between 345 and 515° C. and pressure of 0.4 to 1 MPa, where a configuration is specified, for each of the groups of 480-515° C. and 0.8-1 MPa for the group (i), 375-498° C. and 0.66-0, 85 MPa for the group (ii), 315-393° C. and 0.4-0.72 MPa for the group (iii).

Regarding the active part of the process, the reactor (10) must be arranged, which is made up of two pieces, a container base (11) made of a first piece of SS-316 steel whose internal diameter and height ratio inner is between 0.23-0.34; and a cover (12) formed from a second piece of SS-316 steel, whose external diameter and height ratio is between 2.89-5.6, where both the body (12) and the base mouth (11) of the reactor (10) consist of a channel for packing a metal with a coefficient of linear expansion between 1.65 and 1.79*10^−5 1/° C. that allows hermetic closure to operate conditions, with which it is possible to withstand high temperatures and high pressures mention above. Said metal, with a coefficient of linear thermal expansion between 1.65 and 1.79*10^−5 1/° C., can be chosen from the copper, gold, aluminum, brass, and zinc group.

On the other hand, the furnace (20) is made up of lateral, upper, and lower external walls, leaving an interior space to arrange the base (11) of the reactor (10) and where its upper face (22) comprises an orifice (23) equivalent to the external diameter of the reactor (10), in such a way that a fair coupling between the two is achieved. Consequently, the heat leakage that may be generated in that joint sector is avoided as much as possible.

As has already been said previously, an essential factor for the correct and advantageous execution of the invention process is low energy consumption concerning what is known as state-of-the-art. To achieve said advantage, the oven (20) delivers heat to the reactor (10) through at least six to eight silicon carbide resistors (27), connected in series and physically located in parallel on facing inner sides of the furnace (20), leaving a distance from the resistors (27) to the external surface of the reactor (10), which varies between 2% and 10% of the internal width of the furnace, in this way, the intermittent temperature pulses can be used to their maximum efficiency.

When the process is carried out in its normal operating conditions, a recovered liquid fuel that comprises aliphatic chains that vary between 5 and 25 carbons will be obtained. As a complementary characteristic, a catalyst selected from the group consisting of clays with physicochemical properties homologous to bentonites, such as zeolite (ZM-5, ZM-14, ZSM-5, REY, clinoptilolite), or their mixtures can be added to the reactor.

In another embodiment of the invention, a system (1) is described for obtaining liquid fuel from plastic waste or polymeric material, with reduced energy consumption, according to the previously exposed process. Said system (1) is comprised of: a screening device (2) for classifying the crushed plastic material; a feed hopper (3) for incorporating the crushed and classified plastic material into a processing reactor (10); a processing reactor (10), cylindrical or spherical, made up of a base (11) and a cover (12) that have holes (13) with thread for hexagonal head bolts that adjust their closure, where both the cover (12) as the mouth of the base (11) of the reactor (10) consist of a channel for packing a metal with a coefficient of linear expansion between 1.65 and 1.79*10^−5 1/° C., that allows hermetic closure to operating conditions; an insulated furnace (20), insulated with a ceramic system at least 3 centimeters thick and an internal layer of fiberglass 4 to 10 centimeters thick, which includes on its upper face (22) a hole (23) equivalent to the external diameter of the reactor (10), inside there are at least six silicon carbide resistors (27) that transfer heat to the reactor (10). Said oven (20) can be of any allowed shape, although it is preferred that it have a cubic or cylindrical shape; a cooling coil (30) made up of an arrangement of metal pipes of 2 cm internal diameter and 2.5 cm external diameter, which is connected to the outlet of the reactor (10) employing a drain valve (16) and is made up of a portion of straight pipe that ends in a highly tortuous serpentine arrangement, which forms an internal diameter of 40 cm with a range of turns/torsion of at least A container co0) that includes a highly polar cooling fluid in which the coil (30) is submerged, and that receives the liquid fraction and allows the separation of the liquid fuel; the latter can be extracted from the container (40) using a valve (45) arranged for this purpose.

The reactor (10) has an internal diameter to internal height ratio between [0.21:0.36] and an external diameter to external height ratio between [0.34-0.44] and is made of SS-316. In addition, the lid (12) of the reactor (10) has inputs to connect at least one type K thermocouple and a digital manometer to measure and control the pressure and temperature inside the reactor through an electronic control system; in addition, it has an Inert gas inlet (17) through a high-temperature resistant valve and a drain valve (16) set to a maximum pressure between 0.4 and 1 MPa, which releases the hot fluid towards the cooling coil (30).

The circuit of silicon carbide resistors (27) arranged inside the insulated furnace (20) is connected in series and located in parallel on opposite internal sides of the stove (20), leaving a distance from the resistors (27) up to the external surface of the reactor (10), which varies between 2% and 10% of the internal width of the furnace. Said circuit of silicon carbide resistors (27), arranged inside the stove (20), is commanded by a PID control system that measures the internal and external temperature of the reactor and the pressure, monitoring the thermal balance and manometric, using the previously described input devices.

The container (40) is cylindrical in nature and has a valve (45) arranged at a specific height, which allows the range of hydrocarbons as a liquid fuel to be directly extracted.

In the case the system is used in smaller and highly portable configurations, a series of rotating elements is implemented consisting of a removable carriage arrangement for movement and portability, such as wheels, bearings, or rollers in its base.

The advantages of the present invention are demonstrated through the following example, which should only be considered an exemplary embodiment, and for no reason can it be regarded as a restrictive element for the true scope of the invention.

Example of Application

The following example illustrates the process for producing liquid fuel products according to the modalities established by the process described in this application. The experiments detailed below involve experimental development in the laboratory and field tests.

A vertical cylinder was used for the reactor unit with the characteristics of materials previously described, with dimensions 16 cm of internal diameter and 45 cm of interior height, to form an internal volume of capacity of 9.048 liters (Lts). In comparison, it had 22 cm of external diameter and 50 cm of exterior height to form an external volume of 19,007 Lts, in which 7.2 kg of high-density polystyrene crushed in a particle range between 1200-2500 μm have been loaded, loaded up to 80% of the capacity of the team. A pre-heating process of the oven is started at 220° C. for 15 minutes, with ramps and operating times as described in table 1, which were carried out in triplicate.

TABLE 1

Pilot programs and operating conditions of the equipment (n = 3).

| Program | Ramp rate [° C./sec] | Ramp total time [sec] | Operating Temp [° C.] |
|---|---|---|---|
| 1 | 0.55 | 200 | 330 |
| 2 | 0.37 | 300 | 330 |
| 3 | 0.65 | 200 | 350 |
| 4 | 0.43 | 300 | 350 |
| 5 | 0.70 | 200 | 360 |
| 6 | 0.47 | 300 | 360 |
| 7 | 0.88 | 200 | 395 |
| 8 | 0.58 | 300 | 395 |
| 9 | 1.05 | 200 | 430 |
| 10 | 0.70 | 300 | 430 |
| 11 | 1.24 | 200 | 468 |
| 12 | 0.83 | 300 | 468 |

Subsequently, the liquid fuel generated from the different programs is recovered by condensing the vapor in the cooling coil where yields of the order of 47-78% are obtained, the most efficient programs 11 and 12 according to what is shown in Table 2. Therefore, the standardized operating conditions are repeated to obtain a compositional analysis of the emissions. For this, the gases released from the burning device are recovered and determined if the pollutant emission parameters are below the maximum allowed as established by the European standard (EUR-Lex, 2000), as shown in Table 3. In this way, it is determined that the pilot operation can operate under European standards in the collection sites for the accumulation of municipal plastic waste and other industrial application sectors.

TABLE 2

Fuel yield obtained with thermochemical programs.

| Program | Liquid fraction Conversion [% w/v] |
|---|---|
| 1 | 62.47 |
| 2 | 63.44 |
| 3 | 63.66 |
| 4 | 63.21 |
| 5 | 65.22 |
| 6 | 63.91 |
| 7 | 68.1 |
| 8 | 67.24 |
| 9 | 71.55 |
| 10 | 68.33 |
| 11 | 74.68 |
| 12 | 73.95 |

TABLE 3

Comparison of gas emissions and maximum allowed by the European Union.

| | [mg/Nm$^3$] | |
|---|---|---|
| Compound | Observed | Allowed (EUR-Lex. 2000) |
| Particle matter (PM) | 0.2 | 10 |
| Sulfur compounds (SO2) | <1 | 50 |
| Nitrogen oxides (NOx) | <10 | 200 |
| Tocal Organic Caron (COT) | 2 | 10 |
| Carbon monoxide (CO) | 3 | <10 |
| Cadmium and other metals (Cd) | 0.001 | 0.05 |
| Mercury and other related compounds (Hg) | 0.007 | 0.05 |
| Chloride gases and acids (HCl) | 0.04 | 10 |
| Fluoride gases and acids (HF) | 0.02 | 1 |
| Dioxins (TEQ) | 0.02 mg/Nm$^3$ | 0.1 mg/Nm$^3$ |
| Gas emissions by a processed ton of material | 1.24 | 200 |

TABLE 4

Energy consumption of the oven in different programs.

| Program | Energy consumption (kWh) |
|---|---|
| 7 | 1.25 |
| 8 | 1.35 |
| 9 | 1.27 |
| 10 | 1.31 |
| 11 | 1.42 |
| 12 | 1.45 |

The average energy consumption can reach 1,208 kWh per kilogram of treated plastic. In comparison, the energy capacity of the generated fuel can get 10.4 kWh, considering the calorific value of the liquid fuel obtained (8,947 kcal/Lt). Therefore, although all the previous values are given for the example conditions, these yields can be scalable for plants with greater capacity than the 7 kg sample. This determines a ratio of energy consumed to energy produced of [1:8], which is higher than other processes known in the state of the art that has gaseous and liquid fuels, whose ratio does not exceed [1:4]. This energy relationship is essential to determine the technical and economic feasibility of small and medium-scale devices that can be transported and reach a more significant segment of the community.

Figure 4:
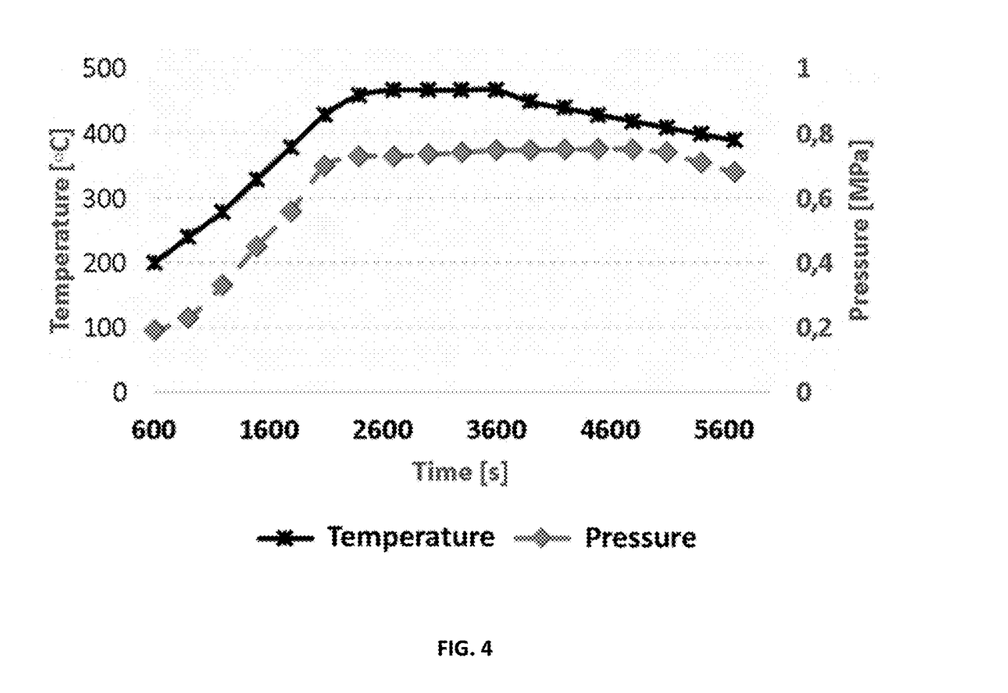
FIG. 4 represents a graph of the temperature ramp according to an example of the process according to the present invention.

Regarding the fuel generated, a liquid oil mix was obtained with properties similar to kerosene/diesel. It was evaluated according to the preform indicated for the characteristics of Petroleum B-02 (Chilean Decree DS 76 No. 2 Establishes fuel quality specifications, Chile, 2013). From the results obtained, performance tests are carried out for home heating machinery, industrial boilers, and kerosene-based motor devices. Programs 11 and 12 generate the highest performance in these temperatures of up to 468° C. is reached, reaching the maximum conversion percentage (75%) between 3500-3600 seconds, under operating pressure conditions between 0.57-0, 72 MPa, as shown in FIG. 4, it shows the fluctuations of temperature and pressure as a function of time according to the operation program No. 11, it can be seen that after the preheating period of the reactor (at least 10 minutes) a substantial temperature increase begins, represented by the variation (addition) of the slope of the curve until it reaches its peak, where the temperature starts to reduce (change in the slope of the curve), but in a less pronounced way, so that the temperature inside the reactor is kept constant. The liquid fuel generated has properties that are homologous to kerosene/diesel and contain impurities under the established standard (ASTM), as shown in Table 5.

TABLE 5

Physicochemical characteristics of obtained fuel from high-density polystyrene with programs 11 and 12 (from table 1).

| Composition | Value | Limit | ASTM Analysis code |
|---|---|---|---|
| Lead (g/L) | <0.03 | 0.013 | D3237 |
| Bencen (% v/v) | 0.24-0.5 | 1 | D3606/D4053 |
| Olefins (% v/v) | 1.8 | 20 | D1319/D6293 |
| Oxygen (% m/m) | 0.15 | 2 | D4815/D5599 |
| Flashpoint | 23 | 52 | D93/D3828 |
| Water and sediments (% v/v) | 0.0093 | 0.05 | D2709 |
| Sulfur (ppm) | 2-3.97 | 15 | D5453/D2622 |

The scope of the process and the system described in the present invention should not be limited only to the components mentioned in the text itself but encompasses the entire process or system intended to obtain liquid fuel from waste plastic material or polymeric material, which includes the operational and functional characteristics described.

What we claim is:

1. A process for obtaining liquid fuels from plastic or polymeric material waste with higher thermodynamic efficiency and conversion yield, where the plastic material waste is first collected and crushed, comprising the stages of:
    disposing of the crushed plastic or polymeric material in a processing reactor, from the smallest to largest particle size;
    vertically arranging the processing reactor in an isolated furnace with a ceramic system of at least 3 centimeters thick and covered with a material based on fiberglass with a thickness between 4 and 10 centimeters;
    preheating the insulated oven to a temperature of 200° C. for at least 10 minutes using a heating system based on silicon carbide (SiC) resistors;
    starting a temperature increase ramp to keep the reaction constant in a temperature range between 345 to 515° C. through intermittent temperature pulses;
    keeping the reactor pressure between 0.4 and 1 MPa, controlled by a manometer and regulated using a drain valve;
    starting the thermocracking of the plastic or polymeric material inside the reactor, keeping the temperature constant for a time of between 30 and 50 minutes;
    releasing a gaseous fraction through an upper duct of the reactor;
    releasing a liquid fraction through the upper duct of the reactor;
    transferring a liquid fraction towards a cooling coil to decant into a container containing a highly polar cooling fluid with a higher density than the recovered liquid fuel;
    extracting the liquid fuel recovered from the container;
    storing recovered liquid fuel in receiving containers; and
    recovering the solid fraction decanted in the reactor.

2. The process for obtaining liquid fuel from plastic or polymeric waste of claim 1, wherein intermittent pulses of energy consumption carry out the temperature increase in the furnace to increase heat efficiency that arises by silicon carbide resistors.

3. The process for obtaining liquid fuel from plastic or polymeric waste of claim 2, wherein the intermittent pulses are controlled to deliver a temperature in the range of 600 to 1500° C. in a time ranging from 1 to 360 seconds.

4. The process for obtaining liquid fuel from plastic or polymeric material waste of claim 3, wherein the temperature pulses delivered by the silicon carbide resistors maintain the constant temperature in the furnace between around 400° C. and 600° C.

5. The process for obtaining liquid fuel from plastic or polymeric waste of claim 3, wherein the thermal balance in the reactor is monitored using a control system capable of controlling temperatures in internal and external ovens.

6. The process for obtaining liquid fuel from plastic or polymeric waste of claim 3, wherein the intermittent pulses are generated by unsteady energy flow from the silicon carbide resistors that generate a consumption from 0 to 32 amps per pulse.

7. The process for obtaining liquid fuel from plastic or polymeric waste of claim 1, wherein the released gaseous fraction is transferred directly to a burning device, where all hydrocarbon gases are reduced that are combusted, and released in the form of CO2.

8. The process for obtaining liquid fuel from plastic or polymeric waste of claim 1, wherein the released gaseous fraction is stored in specially adapted tanks or is recirculated to generate a complementary heat source in the oven.

9. The process for obtaining liquid fuel from plastic or polymeric material waste of claim 1, wherein the solid fraction is recovered and re-entered in the thermocracking stage.

10. The process for obtaining liquid fuel from plastic or polymeric waste of claim 1, wherein the liquid fraction that is directed towards the cooling coil, the hydrocarbons are separated at their point of condensation and by the difference in density between the fluids in the container, which allows the removal of particulate material and other sulfur, nitrogenous or carbon-derived components, through phase separation.

11. The process for obtaining liquid fuel from plastic or polymeric material waste of claim 1, wherein the crushed plastic material has a particle size between 425 and 4750 μm and before entering the reactor, is separated by a sieving system to form three groups with ranges of particle diameters: (i) between 2350 and 4750 μm; (ii) between 1400 and 2349 μm; and (iii) between 425-1399 μm.

12. The process for obtaining liquid fuel from plastic or polymeric waste of claim 11, wherein the sieved plastic or polymeric material is subjected to a sub-stage of separation into groups for which they are determined temperature ranges between 345 and 515° C. and pressure from 0.4 to 1 MPa, in which a setting is specified for each of the groups of 480-515° C. and 0.8-1 MPa for the group (i), 375-498° C. and 0.66-0.85 MPa for the group (ii), 315-393° C. and 0.4-0.72 MPa for the group (iii).

13. The process for obtaining liquid fuel from plastic or polymeric waste of claim 1, wherein the reactor comprises two pieces, a container base made of a first piece of SS-steel whose internal diameter and internal height ratio are between 0.23 and 0.34; and a cover formed from a second piece of SS-316 steel, whose external diameter and height ratio is between 2.89 and 5.6, where both the surface and the mouth of the reactor base consist of a channel for a metal gasket with a linear expansion coefficient between 1.65 and $1.79*10^{-5}$ $1/°$ C. that allows hermetic closure to operate conditions, thus being able to withstand high temperatures and high pressures.

14. The process for obtaining liquid fuel from plastic or polymeric waste of claim 1, wherein the furnace is made up of lateral, upper, and lower external walls, leaving an interior space to arrange the base of the reactor and where its upper face, comprising an orifice equivalent to the outer diameter of the reactor so that a fair coupling between the two is achieved.

15. The process for obtaining liquid fuel from plastic or polymeric material waste of claim 14, wherein the furnace delivers heat to the reactor through at least six silicon carbide resistors, connected in series and physically located parallel on facing inner sides of the stove, leaving a distance from the resistances to the external surface of the reactor, which varies between 2% and 10% of the internal width of the furnace.

16. The process for obtaining liquid fuel from plastic or polymeric waste of claim 1, wherein the recovered liquid fuel comprises aliphatic chains that vary between C5 to C25.

17. The process for obtaining liquid fuel from plastic or polymeric waste of claim 1, wherein a catalyst from the group composed of clays with physicochemical properties comparable to bentonite is added to the reactor.

18. A system for obtaining liquid fuel from plastic or polymeric material waste with reduced energy consumption, comprising:
   a sieving device for classifying the crushed plastic or polymeric material;
   a feed hopper to incorporate the crushed and classified plastic or polymeric material into the processing reactor;
   a cylindrical or spherical processing reactor made up of a base, whose dimensions have a ratio of diameter and internal height between 0.21-0.36 and diameter and external height of 0.34-0.44, and a cover that has holes with thread for hexagonal head bolts that adjust their closure, where both the cover as the mouth of the base of the reactor consist of a channel for packing a metal with a coefficient of linear expansion between 1.65 and $1.79*10^{-5}$ $1/°$ C., which allows hermetic closure to operate conditions;
   an insulated furnace with a ceramic system of at least 3 centimeters thick and an internal layer of fiberglass 4 to 10 centimeters wide, which includes a hole on its upper face equivalent to the external diameter of the reactor, inside there are at least six silicon carbide resistors that transfer heat to the reactor;
   a cooling coil made up of an arrangement of metal pipes with an internal diameter of 2 centimeters and an external diameter of 2.5 centimeters, which is connected to the outlet of the reactor using a drain valve and is made up of a portion of straight pipe that ends in a serpentine arrangement of high tortuosity, which forms an internal diameter of 40 centimeters with a range of turns/torsion of at least 10; and
   a container that includes a highly polar cooling fluid in which the coil is submerged, and that receives the liquid fraction and allows the separation of the liquid fuel.

19. A system for obtaining liquid fuel from plastic or polymeric waste of claim 18, wherein the reactor has a ratio of external diameter to an outer height between 0.34 and 0.44 and is made of SS-316 steel.

20. The system for obtaining liquid fuel from plastic or polymeric material waste of claim 18, wherein the lid of the reactor has inlets to connect at least one type K thermocouple and a digital manometer to measure and control the pressure and temperature inside the reactor, through an electronic control system, an inert gas inlet through a valve resistant to high temperatures and a drain valve set to a maximum pressure between 0.4 and 1 MPa, which releases the hot fluid towards the cooling coil.

21. The system for obtaining liquid fuel from plastic or polymeric waste of claim 18, wherein the circuit of silicon carbide resistors is arranged inside the furnace, They are connected in series and located in parallel on facing inner sides of the stove, leaving a distance from the resistances to the external surface of the reactor, which varies between 2% and 10% of the width internal oven.

22. The system for obtaining liquid fuel from plastic or polymeric waste of claim 21, wherein the circuit of silicon carbide resistors arranged inside the furnace is commanded by a controlling device that measures the internal and external temperature of the reactor, as well as the pressure, monitoring the thermal and manometric balance, through devices arranged for this function.

23. The system for obtaining liquid fuel from plastic or polymeric waste of claim 18, wherein the cylindrical container has a valve arranged at a specific height, which allows extracting the range of hydrocarbons as liquid fuel directly.

24. The system for obtaining liquid fuel from plastic or polymeric waste of claim 18, comprising a series of rotating elements consisting of a removable carriage arrangement for movement and portability.

* * * * *